United States Patent [19]

Kellar et al.

[11] Patent Number: 5,090,909
[45] Date of Patent: Feb. 25, 1992

[54] VIDEO GRAPHIC SIMULATOR SYSTEMS

[75] Inventors: Paul R. N. Kellar, Newbury; Robin A. Cawley, Ball Hill; Alan L. Stapleton, Newbury, all of England

[73] Assignee: Quantel Limited, Surrey, England

[21] Appl. No.: 562,442

[22] Filed: Aug. 2, 1990

Related U.S. Application Data

[63] Continuation of Ser. No. 289,425, Dec. 23, 1988, abandoned, which is a continuation of Ser. No. 633,321, Jul. 23, 1984, abandoned.

[30] Foreign Application Priority Data

Jul. 28, 1983 [GB] United Kingdom ............... 8320357

[51] Int. Cl.[5] .......................... G09B 9/00; H04N 5/22
[52] U.S. Cl. ...................................... 434/43; 273/437; 358/183; 340/725
[58] Field of Search ............... 434/43, 44; 273/1 E, 273/DIG. 28, 856, 433, 434, 437; 358/22, 104, 183; 340/321, 325, 328

[56] References Cited

U.S. PATENT DOCUMENTS

| | | | |
|---|---|---|---|
| 3,941,925 | 3/1976 | Busch et al. | 358/183 |
| 4,107,780 | 8/1978 | Grimsdale et al. | 434/43 |
| 4,209,832 | 6/1980 | Gilham et al. | 434/43 |
| 4,290,832 | 6/1980 | Gilham et al. | 358/183 |
| 4,360,831 | 11/1982 | Kellar | 358/183 |
| 4,420,770 | 12/1983 | Rahman | 358/183 |
| 4,509,043 | 4/1985 | Mossaides | 340/721 |
| 4,570,233 | 2/1986 | Yan et al. | 358/104 |
| 4,580,158 | 4/1986 | Macheboeuf | 358/183 |
| 4,585,418 | 4/1986 | Stickel | 434/20 |
| 4,586,038 | 4/1986 | Sims et al. | 340/725 |
| 4,602,286 | 7/1986 | Kellar et al. | 358/183 |
| 4,641,255 | 2/1987 | Hohmann | 358/183 X |
| 4,835,532 | 5/1989 | Fant | 340/728 |

Primary Examiner—Edward M. Coven
Assistant Examiner—Jessica J. Harrison
Attorney, Agent, or Firm—Dowell & Dowell

[57] ABSTRACT

Sources of video signals representing an object (e.g. an aircraft), optionally movable, and a scene provide data stored in frame stores (1,5). Distance (optionally variable) from the observer of the object and near and far distances at transitions between features in the scene are stored respectively in frame store (4) and (7a, 7b). Within the boundaries of the object and in the neighborhood of the lines of transition, between features of the scene, quantities stored in object and scene stencil frame stores (3, 6) vary from 0 to 1. All frame stores are read simultaneously, driven by a microprocessor (2), the picture point scanning element sequentially. A comparator (11) compares distances, and the results of the comparison, together with the values stored in the stencil frame stores, determine the tone displayed at each element. Near features obscure distant ones, and sharp transitions are softened.

10 Claims, 2 Drawing Sheets

VIDEO GRAPHIC SIMULATOR SYSTEMS

This application is a continuation of application Ser. No. 07/289,425, filed Dec. 23, 1988, abandoned, which is a continuation of 06/633,321, filed July 23, 1984, abandoned.

BACKGROUND TO THE INVENTION

This invention relates to video graphic simulator systems, that is to say systems in which video signals are generated capable of producing an image on a television receiver, the signal being, however, generated or processed electronically with the aid of digital processing circuits.

A known form of such a system comprises a source of video signals representing a scene in which an object is movable. The scene may for example be generated using a system such as described in co-pending UK Patent Application No. 8136539. The source of these signals may be one or more frame stores. In addition there is a source of signals representing the object, the source being again, for example, a frame store. The object is associated with so-called stencil signals, one for each picture point for which there is an object signal, the stencil signals being usable to substitute the object signals for scene signals at the respective picture points, so that the object may be introduced in the scene. Furthermore, a computer or other control device is provided for scrolling the object signals and the associated stencil signals in some pre-determined way to represent movement of the object with respect to the scene.

OBJECT OF THE INVENTION

The object of the present invention is to provide an improved video graphic simulator system of the general kind described in the preceding paragraph, with greater facilities for simulating real-life situations.

SUMMARY OF THE INVENTION

According to the present invention there is provided a video graphic simulator system comprising:
 a) first source means for video signals representing a scene;
 b) second source means for video signals representing a relatively small object moving with respect to the scene;
 c) third source means for signals representing the distances from different features in the scene to the observer and from the object to the observer;
 d) processor means for selectively superimposing one of the scene and object video signals on the other of the scene and object video signals in dependence upon the relationship of said object and scene distance signals;
 e) means included in said processor means for gradually reducing the intensity of the object video signals at the edges of the object where the object is superimposed on the scene, and also at discontinuities where a feature of the scene obscures part of the object; and
 f) display means for displaying the combined video signals.

Preferably, means may also be provided to vary the signal representing the distance to the object so that the object may be made to appear to pass in front of a feature on one occasion and behind it on another.

The invention may be used in conjunction with other known features of video graphic simulator systems. For example, the system may include means for simulating rotation of the object, for example about a vertical or horizontal axis, or for varying the size of the object to represent movement toward or away from the observer, or for scrolling or rotating the scene including the object, to represent movement of the observer.

BRIEF DESCRIPTION OF THE DRAWINGS

In order that the present invention may be more clearly understood and readily carried into effect, one example of the invention will now be described with reference to the accompanying drawings, in which.

DESCRIPTION OF PREFERRED EMBODIMENT

Figure 1:
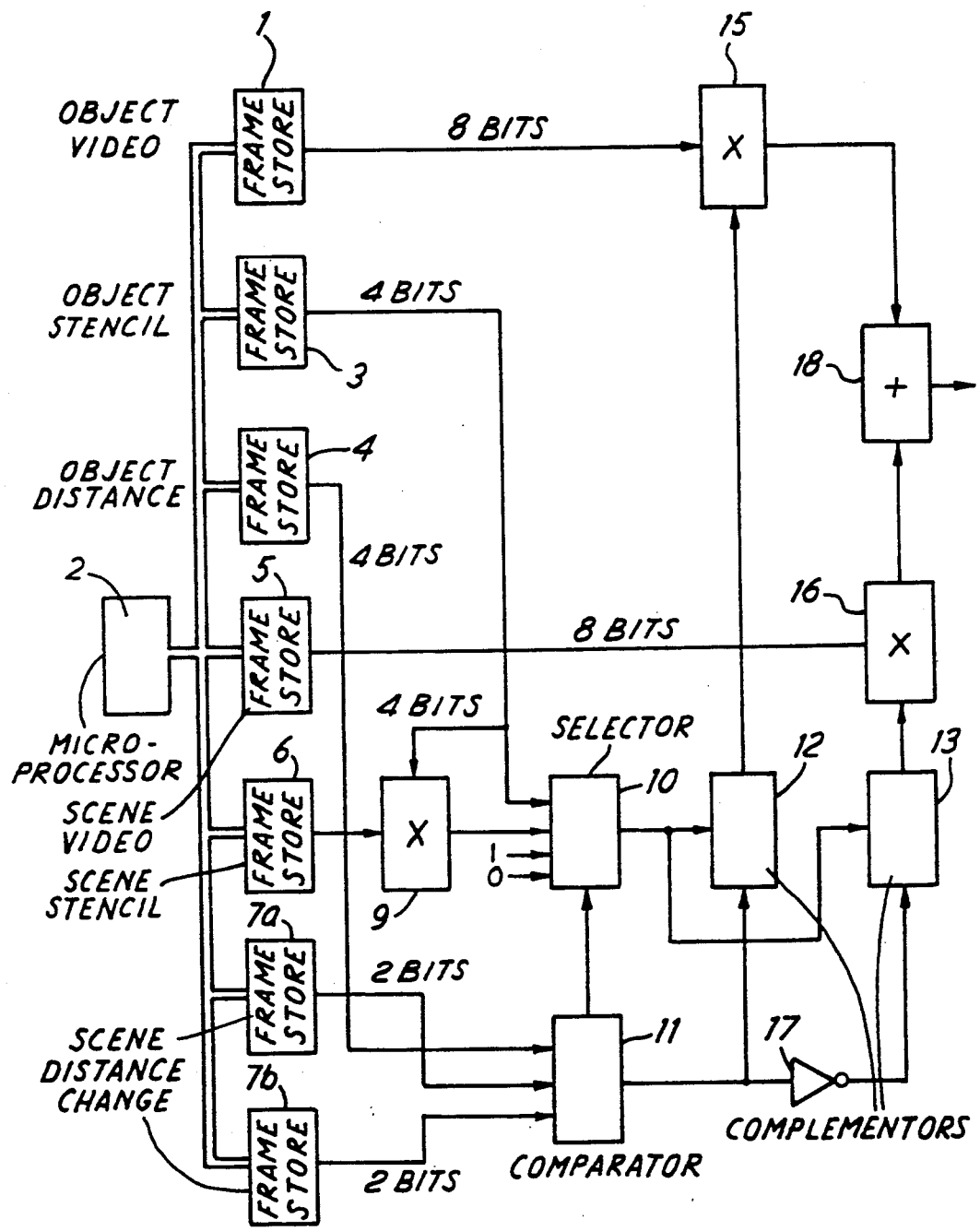
FIG. 1 illustrates, in block form, the said example.

Referring to the drawing, reference 1 denotes a frame store for video signals representing the object to be displayed on the monitor screen. In this example, the object will be assumed to be an aircraft. The frame store is of known construction and is arranged to store the object video signals in the form of eight-bit digital words, each word representing the luminance of the object at a respective picture point on the television raster. Since the object will usually be represented as small in size relative to the television picture, many of the digital words will correspond to points outside the boundary of the object and so will be of the value corresponding to black, or zero luminance level. As illustrated, the signals are provided from a micro-processor 2 including a computer and the signals are generated or processed by this processor to provide them to the frame store 1 in correct form and order. The signals can also be read from the frame store at the correct line and field rate for reproduction by a television monitor or receiver, conversion from digital to analog form being, of course, required at some suitable point in the circuit chain from frame store to television reproducing tube. The video signals representing the object may be generated, if desired, with the aid of a video image creation system such as described in the aforementioned UK Patent Application No. 8136539 and means, which may be under manual control, are included in the microprocessor for varying the signals applied to, and therefore read from the frame store 1, to represent movement of the object in azimuth, range and/or height either with or without a change of course, said signal variations including such variations as are required to make the object, as seen on the television screen, undergo the appropriate changes in size and/or orientation. Means for producing such variations are known and will not be further described. For example, the means may comprise Digital Production Effects equipment known as the DPE 5000 series, manufactured and sold by Quantel Limited, Kenley, England. In the present example, variation of the object video signals to represent a change in position are made as between one frame and another.

Two further frame stores 3 and 4 are provided associated with store 1. The first of these stores 3 is arranged to store signals representing what is called the object stencil. In this example, this signal takes the form of a series of four-bit words, one for each picture point on the television raster. They can be thought of as defining a stencil aperture, through which the object video signals derived from the store may be added to composite video signals which are produced for application to the television monitor or receiver. In practice each stencil signal represents a coefficient K, used as multiplying factor for the object video signals, and they have a value zero (opaque) for picture points outside the boundary of the object, a varying value for picture points in a margin around the inside of the boundary, and a value one (transparent) for picture points inside the margin. For the picture points in the margin which may have a width of any desired number of picture points the object stencil signals vary smoothly in value (according to a desired law) from zero to one. It will be appreciated that variation of the position of the object video signals in the frame store 1 as between one frame and another will require a corresponding variation of the object stencil signals, and such change is effected by the micro-processor 2. Similarly, if the object video signals are varied to represent a change of size or orientation, the object stencil signals are also changed appropriately. The store 3 performs a similar function to the "shape store" 23 described in the aforesaid Patent Application No. 8136539, and the use of the object stencil signals will be more fully explained subsequently. The use of stencil signals to introduce the object video signals in scene video signals avoids "staircasing" effects such as might arise otherwise, and produces the grading at the edges of the object or the scene.

The second of the frame stores 4 associated with the object video store 1 is called the object distance register. This is arranged to store signals in the form of four-bit words representing the distance from the observer to the object. The object distance signal is being updated as required by the microprocessor 2, and is identical for any one frame; if variation is required, such variation is carried out only between one frame and another. The two associated stores 3 and 4 may be provided by two halves of a single frame store capable of storing eight-bit words.

The system illustrated comprises a further four frame stores, 5, 6, 7a and 7b. Frame store 5 constitutes the scene video store and corresponds to the object video store. It stores video signals in the form of eight-bit words representing the luminance of the scene to be displayed at respective picture points on the television raster. The scene video signals will normally represent various features, such as sky, clouds, fields, hills, sand and sea for an outdoor scene, filling the whole television picture. The scene video signals are applied to the store 5 by the micro-processor 2 and may be varied thereby from time to time as desired. The frame store 6 is arranged to store scene stencil signals for various features of the scene, as will be described in more detail subsequently and the frame stores 7a and 7b are arranged to store distance signals associated with different features of the scene. The signals are two-bit digital words, and, for each of a number of zones in the scene, two such signals are stored respectively in the two stores 7a and 7b, as will be explained with reference to FIG. 2. The stores 6, 7a and 7b may be provided by parts of a single frame store capable of storing eight-bit words.

Figure 2:
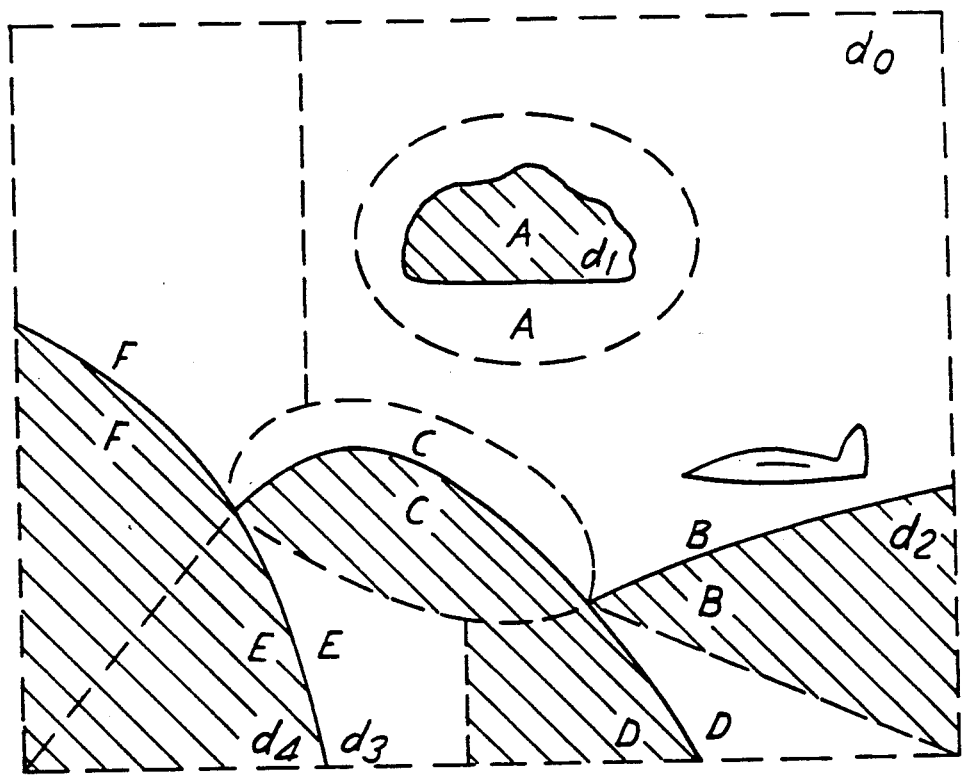
FIG. 2 is a diagram illustrative of the operation of the system illustrated in FIG. 1.

FIG. 2 illustrates a scene such as might be represented by the scene video signal. As shown, the scene comprises an area of unclouded sky $d_0$ a cloud $d_1$ and three hills $d_2$, $d_3$ and $d_4$. The suffices denote that the sky is the most distant feature, that the cloud is farther away than the hills, whilst three hills $d_2$, $d_3$ and $d_4$ are progressively nearer to the observer. Dotted lines have been shown drawn on the scene, and these lines divide the scene into zones A, B, C, D, E, F. The zones are chosen in such a way that each zone contains one and only one boundary between features at which a distance change occurs.

Thus, zone A contains a boundary between distance 0 and 1, zone B contains a 0/2 boundary, zone C contains 0/3 boundary, zone D contains a 2/3 boundary, zone E contains a 3/4 boundary and zone F contains a 0/4 boundary. In accordance with the invention, the stores 7a and 7b are arranged to store signals representing the two distances in each zone of the picture, the same two signals being stored for each picture point in a respective zone. One distance signal for a zone represents the nearer features, this being stored in store 7a, and the other represents the more distance feature in the zone and is stored in store 7b. The two signals are read together, however, to constitute a single zone signal. In the simple example illustrated, five feature distances are represented, and of these 0 to 3 can occur in store 7a, whilst 1 to 4 can occur in store 7b, so that two stores each capable of storing two-bit digital words are adequate. The scene stencil signals are arranged to be zero for the parts of the scene shown cross hatched in full lines, to be ½ (or some other value representing a degree of opacity) for the part of the scene shown cross-hatched in dotted lines, and to be unity in the unhatched part of the scene, except in a margin at each boundary at which a distance change occurs, in which margin there is a gradual transition from unity to the value for the cross hatched part. In FIG. 2, the object is shown diagrammatically as the outline of an aircraft.

Reverting now to FIG. 1, it will be appreciated that when the system is operated to display a picture, all the frame stores, 1, 3, 4, 5, 6, 7a and 7b are read in parallel, so that at any one instance signals relating to a single picture point are read out simultaneously from all the stores, successive picture points being read successively. Object stencil signals are applied from the store 3 to a stencil product circuit 9 and to a selector circuit 10. Scene stencil signals are applied as the second input to the stencil product circuit 9. The distance signal from the store 4 and the distance signals from the stores 7a and 7b are applied to a comparator 11 which includes a look up table, from which a decision signal is produced depending on the comparison between the signal from the store 4 and the signals from the stores 7a and 7b. The output of the look-up table controls the selector circuit 10 to determine which of the applied stencil signals should be used. In addition to the two inputs already mentioned, the selector circuit 10 has inputs consisting of signals equivalent to unity and zero, which can be selected as required. The selected stencil signals at any instant is applied as a digital signal in parallel to two complementing circuits 12 and 13, the outputs of which are applied respectively to two digital multipliers 15 and 16. Multiplier 15 receives as its multiplicand the object video signals emanating from the store 1, and the multiplier 16 receives as its multiplicand the scene video signals from the store 5. A second output from the comparator 11 is applied to the complementing circuit 12, and when this output has a first value, depending on the output of the comparator 11, the complementing circuit 12 is rendered operative and when it has a second value the complementing circuit is rendered transparent. The same signal is applied via an inverter 17 to the second complementing circuit 13 so that this latter circuit is transparent when circuit 12 is effective and vice versa. The outputs of the multiplying circuits 15 and 16 are combined by an adding circuit 18. The output of the adding circuit will comprise frames of the video signals representing the scene, with the video signals representing the object selectively interspersed among the scene signals.

It is arranged that the distance signal for the object always represents a distance intermediate between the distances chosen for the features of the scene. The comparator circuit is arranged to produce output signals having the following effect, depending on the comparison between the object distance signal on the one hand and scene distance signals on the other:

1. Object distance less than both feature distances in the respective zone: decision - use object stencil. The selector circuit 10 then selects the direct output from the object stencil store 3 and blocks the output from the stencil product circuit 9. The complementing circuit 12 is rendered transparent and the complementing circuits 12 and 13, and the multipliers 15 and 16 ensure that, for any picture point, the output signal from the circuit 18 represents:

$$K \times object\ video\ signal + (1-K) \times scene\ video\ signal.$$

When K is zero, the output signal is the scene video signal alone and when K is one the output signal is the object video signal alone. In the margin of the stencil, for which K varies smoothly from zero to one, the object video signal smoothly replaces the scene video signal to give a pleasing transition, even when the position of the object on the scene is changing from frame to frame.

2. Object distance between the two feature distances in the respective zone: decision - use the product of the object and scene stencils. The selector circuit 10 then selects the output from the stencil product circuit 9 and blocks the direct output from the object stencil store 3. This situation could arise for example when the object is in front of the unhatched part of zone E. For this situation the scene stencil signals are unity and the product of the two stencil signals is the same as the object stencil, so that the object remains in full view. However, if the object moves into the hatched part of the zone, for which the scene stencil signals are zero the product of the two stencil signals becomes zero, causing the object to be obscured by the hill $d_4$. If, in a similar situation, the object overlaps the cloud $d_1$, it becomes only partly obscured, depending on the value of the respective scene stencil signals. The complementary circuit 12 is transparent and circuit 13 effective.

3. Object distance greater than both feature distances in a zone: decision - ignore the object stencil. In this case the signal from the comparator 11 causes the selector 10 to select the input signal representing unity to be used as the coefficient K, and the complementing circuit 12 is rendered effective, whilst 13 is rendered transparent.

To illustrate the operation, assume that the object is in zone B in front of the sky, that it proceeds into zone C, passing the hill $d_3$, then proceeds into zone E and finally passes into zone F, emerging outside the boundary of the hill $d_4$. The distance of the object is between $d_3$ and $d_4$.

In zone B, the object distance signal is greater than both feature-distance signals, indicating that the object is nearest. The object stencil is effective and the object video signals, where present, replace the respective scene video signals, so that the object appears in front of the sky.

On passing into zone C the same situation prevails and the object stencil remains effective. When the boundary of hill $d_3$ is encountered no change in operation occurs and the object appears to pass in front of the hill, as required.

On passing from zone C to zone E, the signal from the circuit 11 recognizes that the object should pass behind the hill $d_4$. Until the object encounters the boundary of this hill, however, the object stencil remains effective and the object continues to appear in front of hil $d_3$. On encountering hill $d_4$ the product of the object and scene stencil signals becomes zero to remove the object video signals progressively until the object is wholly obscured. The gradual decline of the stencil signals in the margin at the boundary ensures that the occulting of the object seems natural and "staircasing" is avoided.

On passing into zone F, the situation remains unchanged at first, but on this occasion the scene stencil signals grow to unity at the boundary of hill $d_4$, causing the object to reappear, being keyed by the object stencil signals.

It will be noted that the comparator circuit 11 provides a decision for every picture point in a frame. For this reason no difficulty arises even if the object overlaps two boundaries in the scene at a particular time. As any particular frame is read from the stores 1, 3, 4, 5, 6, 7a and 7b, the comparator 11 will produce decision signals for every zone of the picture, including those not occupied by the object 1. Assume, in FIG. 2, a picture point representing sky in zone F. The scene video signal will represent the luminance of the sky, the scene stencil signal will be unity, and the distance signals will be 0 and 4. At the same instant, the object video signal will represent zero luminance, the object stencil signal will also represent zero and object distance signal will be between 3 and 4. In this situation, the comparator 11 will select as the stencil signal the output of the product circuit 9. This will be zero, causing the output of the multiplier 15 to be zero so that only the scene video signal will be applied to the adding circuit 18, producing the required output. It will also be appreciated that in view of the point-by-point decision making, the object video signal may represent more than one object which may have different distance signals associated with them, and may even overlap. In the case of overlapping objects, the object-distance store would need two components in the same manner as the feature distance store.

In the foregoing description only luminance video signals have been referred to. It will be understood that chrominance signals will normally also be provided for both the object and the scene, so that the television picture will be colored. Therefore the system comprises two further frame stores (not shown) one for the object chrominance signals and the other for the scene chrominance signals, the appropriate signals being applied to and read from these stores under the control of the micro-processor 2, and subsequently processed under the control of the stencil and distance signals in exactly the same way as the luminance signals before being combined in known manner to produce respective object and scene color television signals. Since the same stencil and distance signals are used for either pair of luminance and chrominance signals, the stores for such signals need not be duplicated.

It will be understood that many variations may be made in the example described. For example, the number of bits used for each stencil signal or distance signal may be varied and different logic circuits may be employed to achieve the special effects described in this specification.

Figure 3:
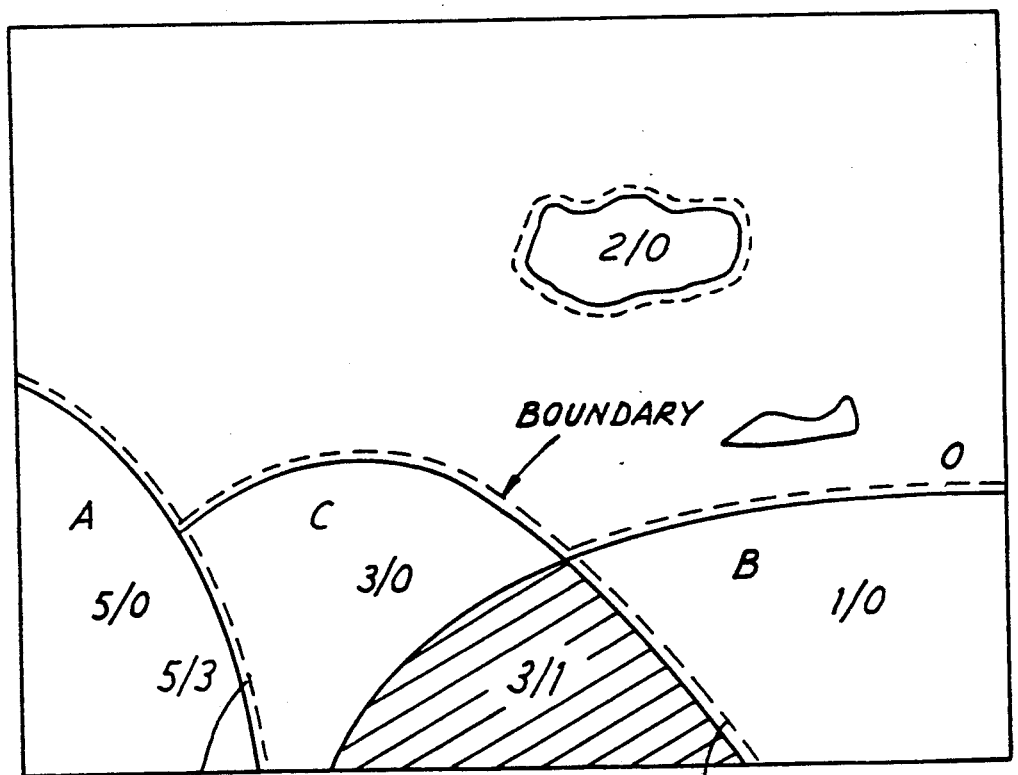
FIG. 3 is a diagram illustrative of the operation of a more efficient way of putting the invention into practice.

A more efficient way of putting this invention into practice will now be described with reference to FIG. 3.

The scene is divided into zones, the boundaries of which follow the edges where there is a change in the distance signal. This can be done when writing the scene into the frame store by putting a boundary wherever the stencil signal falls to zero. The zones then contain one feature of the scene and in the example discussed before will be as shown in FIG. 3.

The scene stencil is everywhere unity except in narrow bands near such boundaries. In each band the scene stencil falls abruptly to zero then rises gradually to unity again at the side of the boundary on which the scene feature is near. The scene stencil exhibits a notch at each boundary. For example, in the vicinity of point 20, the scene stencil falls from one to zero at the dotted line, then rises gradually for picture points between the dotted and full lines, to become unity at the full line. A similar situation arises in the vicinity of point 21.

Instead of the two-bit frame stores 7a and 7b storing distance signals for the zones a store is used which stores four-bit words representing the distance information within a given zone. By using a four-bit store 16 pieces of information can be stored and these are used to represent the different combination of distance signals which can occur. For example the nearest feature in front of the most distant etc. Each feature within the scene is given a distance code where 5 represents the nearest feature and 0 the most distant, this coding leads to 16 different combinations, i.e., 0, 1, 2/0, 2/1 ... 5/4, where 2/1 means a code 2 feature in front of a code 1 feature. Each of these codes therefore gives information on the feature which can be seen as a zone but also on the feature which is next furthest away from the observer. The boundary at which the distance code changes is always that indicated by the dotted line. This enables any object with an intermediate distance signal to appear to pass between features. If we consider the hill C in FIG. 3, when A has code 5, C code 3 and B code 1 with the sky code. In the cross-hatched part of zone C there is a distance code 3 feature in front of the code 1 feature and this is represented as 3/1. For the rest of the zone the code is 3/0. If the object is distance code 2 then it will appear to pass in front of 3 but behind C. As in the FIG. 1 arrangement, a decision as to the correct stencil signal to use is based on a comparison of the object distance code and the scene distance code. As in FIG. 2, if the object distance is less than the two feature distances in a particular zone, the object stencil alone is used. Similarly if the object distance is greater than both feature distances, the object stencil is ignored. However, the scene stencil alone is used when the object crosses into a zone when the object distance is between the two feature distances. The respective notch in the scene stencil causes the object to disappear gradually behind the nearer feature. This system of coding ensures that at the edges the right type of keying takes place so that there are no adverse 'edge' affects where the coding changes The combining of the video signals is done as before.

We claim:

1. A video graphic simulator system comprising:
   a) first source means for video signals representing a scene which includes features at different distances from an observer and which are separated by boundaries;
   b) second source means for video signals representing an object moving with respect to the scene;
   c) third source means for video signals representing a stencil for the scene and a stencil for the object, each of said stencils for the scene and the object having a value for each point of the scene which values are graduated at the boundaries between the features;
   d) fourth source means for signals representing the distances from the features in the scene to the observer and from the object to the observer;
   e) means for deriving contemporaneous sequences of video signals from said first, second and third source means with corresponding signals in said sequences relating to the same point on the scene;
   f) processor means responsive to successive video signals derived from said third source means for selectively interpolating one of the corresponding scene and object video signals on the other of said corresponding scene or object video signals in dependence upon the relationship of said object and scene distance signals;
   g) means included in said processor means responsive to video signals from said third source means for gradually reducing the proportion of the object video signals and increasing the proportion of the scene video signals at the edges of the object where the object is interpolated on the scene, and also at discontinuities where a feature of the scene obscures part of the object; and
   h) display means for displaying the combined video signals.

2. The video graphic simulator of claim 1 in which the boundaries are defined having predetermined margins, the values of said object and scene stencil signals being graduated within said margins.

3. The video graphic simulator of claim 2 wherein the value of the object stencil is zero at each point in the scene remote from the object and outside of said margins.

4. The video graphic simulator system according to claim 1 including means for varying the size, position or orientation of the object as represented by the object video signals and object stencil as represented by the object stencil video signals.

5. The video graphic simulator system according to claim 1, including means for varying the object distance signals so that the object may appear to pass in front of a feature at one time and behind it at another.

6. The video graphic simulator system according to claim 1, including means for dividing the scene video signals into zones each containing a boundary between features and assigning to said zones distance signals indicating the distance of the respective features at the boundary.

7. The video graphic simulator system according to claim 6, wherein said processor means is arranged to compare the object distance with feature distances at the boundary for each zone.

8. The video graphic simulator system according to claim 1, in which the object stencil signals are used to superimpose the object video signals on the scene video signals when one relationship is encountered between said distance signals, and the scene stencil signals are used to superimpose the scene video signals on the object video signals when a second relationship is encountered between said distance signals.

9. The video graphic simulator system according to claim 8, in which both said stencil signals are ignored when a third relationship is encountered between said distance signals.

10. The video graphic simulator system as claimed in claim 8, in which said stencil signals are multiplied together when said second relationship is encountered.

* * * * *